Figure 2:
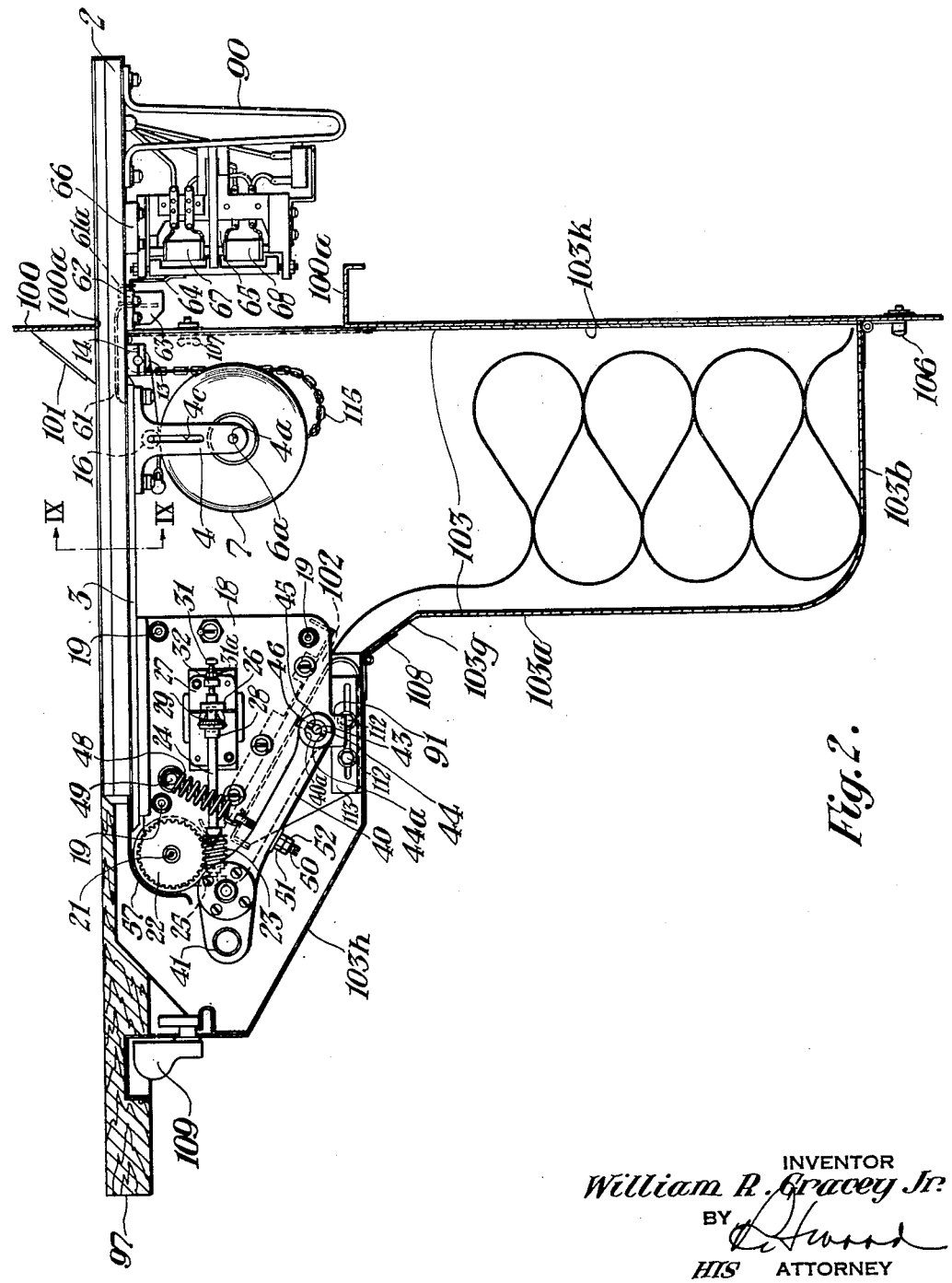

March 17, 1953 W. R. GRACEY, JR 2,631,848
PAPER ADVANCING MEANS FOR GRAPHIC RECORDERS
Filed Jan. 25, 1947 4 Sheets-Sheet 1
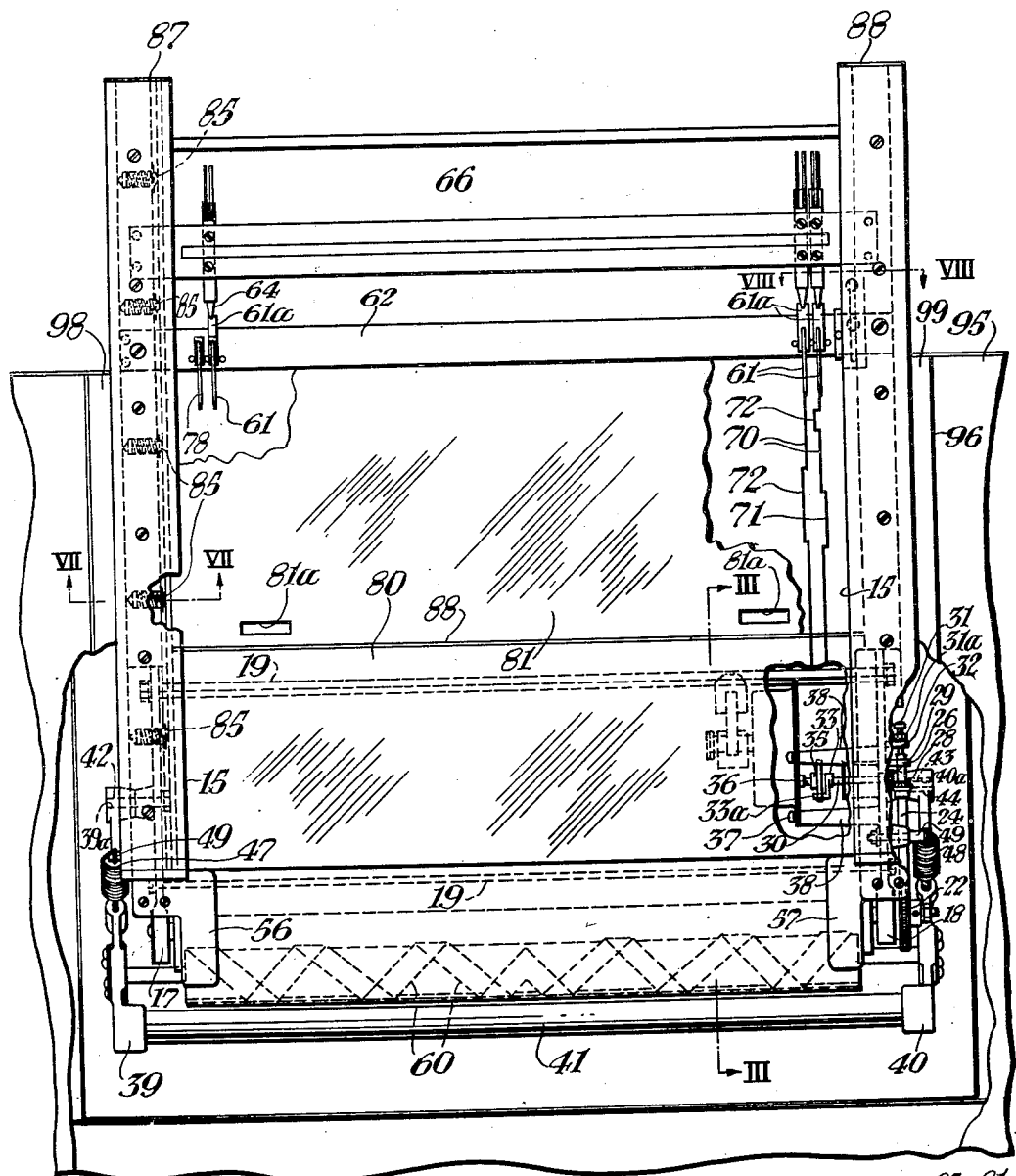
Fig.1.
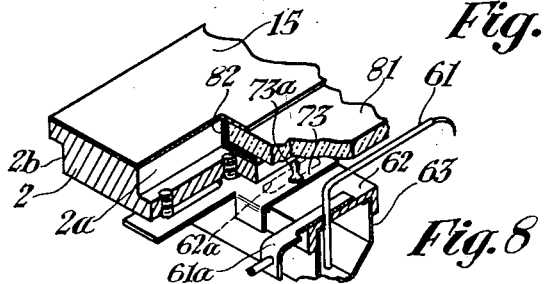
Fig.8
Fig.7.
INVENTOR
William R. Gracey Jr.
BY
HIS ATTORNEY March 17, 1953 W. R. GRACEY, JR 2,631,848
PAPER ADVANCING MEANS FOR GRAPHIC RECORDERS
Filed Jan. 25, 1947 4 Sheets-Sheet 2

INVENTOR
William R. Gracey Jr.
BY
HIS ATTORNEY

March 17, 1953 W. R. GRACEY, JR 2,631,848
PAPER ADVANCING MEANS FOR GRAPHIC RECORDERS
Filed Jan. 25, 1947 4 Sheets-Sheet 3

INVENTOR
William R. Gracey Jr.
BY
HIS ATTORNEY

March 17, 1953 W. R. GRACEY, JR 2,631,848
PAPER ADVANCING MEANS FOR GRAPHIC RECORDERS
Filed Jan. 25, 1947 4 Sheets-Sheet 4

INVENTOR.
William R. Gracey Jr
BY
HIS ATTORNEY

Patented Mar. 17, 1953

2,631,848

UNITED STATES PATENT OFFICE 2,631,848

PAPER ADVANCING MEANS FOR GRAPHIC RECORDERS

William R. Gracey, Jr., Swissvale, Pa., assignor to Westinghouse Air Brake Company, a corporation of Pennsylvania Application January 25, 1947, Serial No. 724,429

2 Claims. (Cl. 271—2.3)

My invention relates to automatic recorders, and particularly to automatic recorders suitable for, although in no way limited to, use in railway signaling systems to record the time at which trains pass designated locations within a controlled territory (OS time), the condition of the signals at a particular location at any specified time, the position of a switch at any specified time, etc.

One well-known form of an automatic recorder of the type described comprises a roller of time-lined record paper which is advanced at a uniform rate of speed, and upon which a series of lines are traced by means of pens movable to different positions by electrically controlled pen operating means. The time at which any particular recorded function occurs is represented by an offset in the line traced by the pen provided for that particular function.

One object of my invention is to provide an improved drive mechanism for the record paper in a recorder of the type described.

Another object of my invention is to so construct the recorder that substantially all parts of the record paper after it passes the pens may be readily inspected at all times.

Another object of my invention is to provide the recorder with a sliding glass cover which may be moved to different positions without binding to give access to substantially all parts of the paper normally located beneath the cover and to the pens.

Another object of my invention is to provide a recorder of the type described in which the record paper can be accurately set to the desired time with a minimum of effort.

A further object of my invention is to provide a recorder of the type described in which the portion of the record paper upon which a record has been made can be readily severed from the stock roll without disturbing the time setting of the paper.

Still further objects of my invention are to cheapen and simplify the construction of a recorder of the type described, while at the same time increasing its utility for its intended purpose.

According to my invention, the recorder comprises a suitable frame consisting of two runners secured in parallel spaced relation to the opposite sides of a bed plate. A roll of time-lined record paper is suspended from the underside of the frame, and the record paper from this roller is carried up over the bed plate and down over a drive roll disposed at the forward end of the bed plate. The drive roll is disposed with its upper edge in horizontal alignment with the upper surface of the bed plate and is driven at a constant speed by any suitable drive means such as a synchronous motor. The record paper is caused to move in synchronism with the drive roll by means of a pressure roll held into engagement with the paper passing over the drive roll by spring pressure, whereby the necessity for drive pins on the drive roll and cooperating perforations in the paper are eliminated. The pressure roll is provided with strips of felt extending spirally in opposite directions from the center of the roll toward each end to prevent the formation of wrinkles in the paper, and is mounted in a supporting frame in such manner that it can readily be swung out of engagement with the drive roll to facilitate setting the paper to the desired time and to permit the roll of record paper to be readily inserted into place in the recorder. The supporting frame for the pressure roll is pivotally mounted at one end through the medium of an eccentric bushing which can be rotated to different positions whereby the longitudinal alignment of the pressure roll with respect to the drive roll can be varied slightly to keep the proper operative relation between the drive and pressure rolls to cause both sides of the paper to be advanced uniformly irrespective of differences which might otherwise result due to necessary manufacturing tolerances. The proper tension is maintained on the record paper by a drag rod biased by gravity into engagement with the record paper above the supply roll. The record is made on the record paper by electrically controlled pens mounted on a pen support bar and disposed to engage the record paper above the bed plate. The record paper as it leaves the drive roll moves through a polished chute into a storage bin. The lower portion of the chute is attached to the recorder cover, and when this cover is lowered to the open position, the record paper is accessible for reference and for the removal of accumulated paper. The paper where it moves across the bed plate is covered by two glass covers mounted to slide in velvet covered guides located in recesses milled in the upper inner edges of the runners. The one guide is spring loaded by means of pressure springs to keep the glass cover firmly in position and to enable the glass cover to be moved to give access to the record paper and to the pens without any binding of the cover.

Other objects and characteristic features of my invention will become apparent as the description proceeds.

I shall describe one form of graphic recorder embodying my invention, and shall then point out the novel features thereof in claims.

Figure 3:
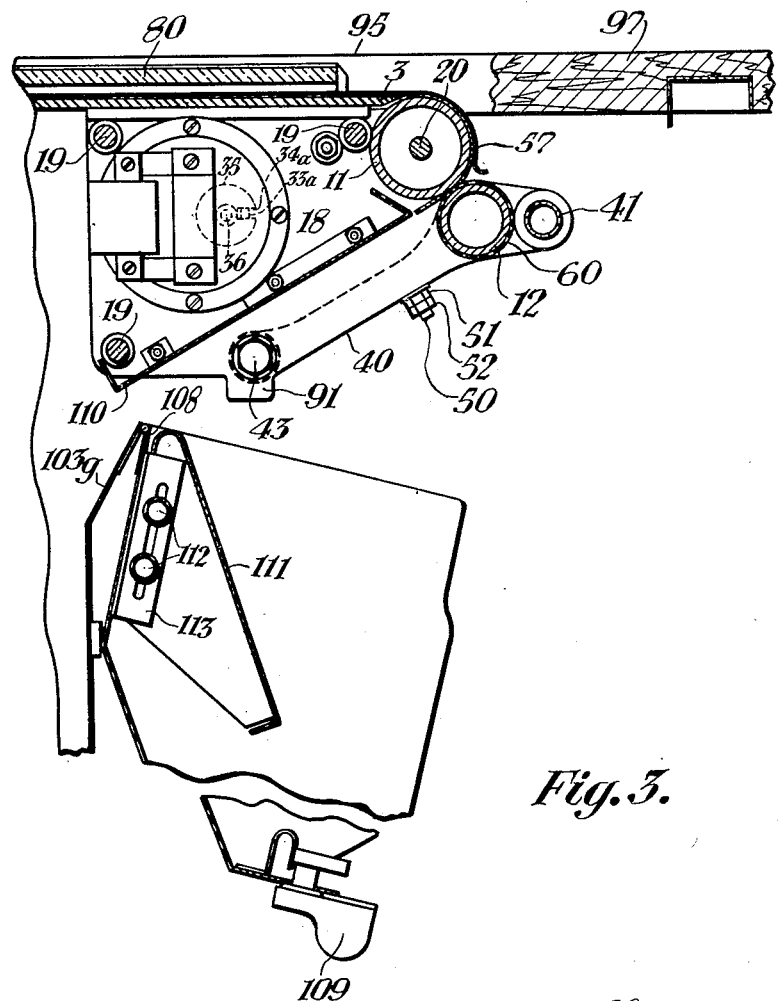
Figures 5, 6:
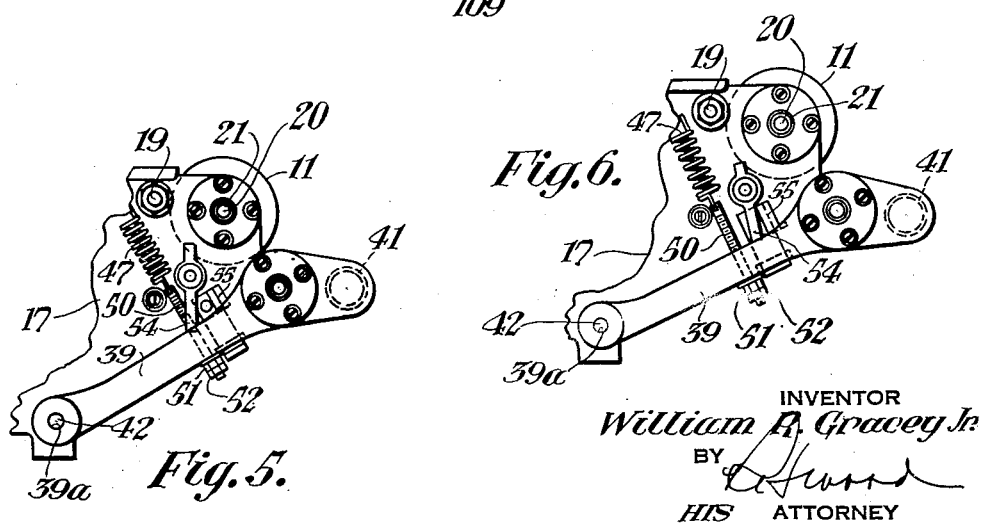
Figure 4:
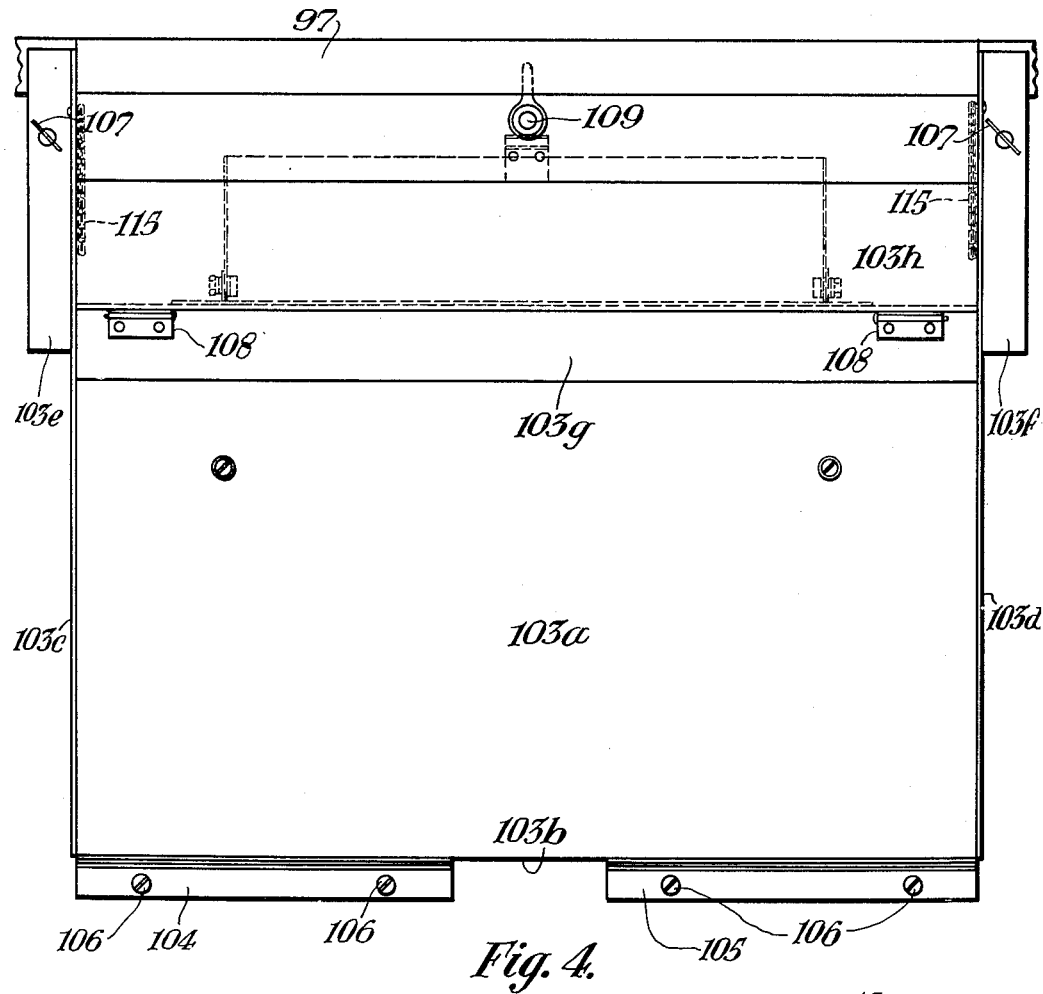
Figure 9:
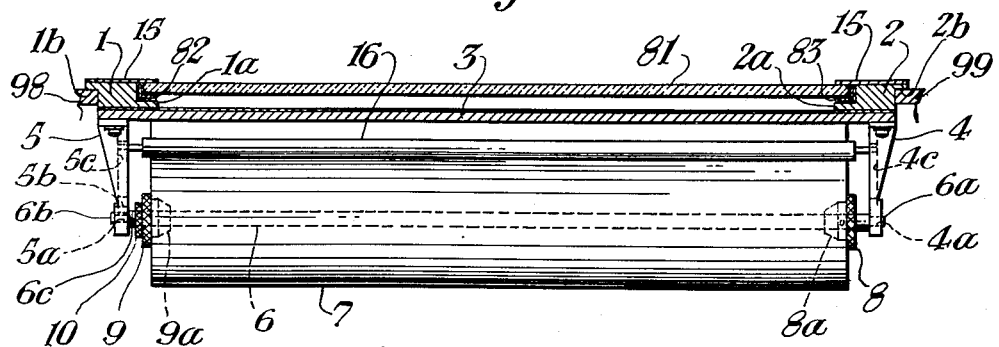

In the accompanying drawings, Fig. 1 is a top plan view of a graphic recorder embodying my invention with certain of the parts broken away to more clearly illustrate the construction of the remaining parts. Fig. 2 is a right-hand end view of the recorder in place in the desk of the control cabinet for a centralized traffic control system for railroads, some of the parts being shown in section for the sake of clearness. Fig. 3 is a sectional view of the recorder taken substantially on the line III—III of Fig. 1. Fig. 4 is a front view of the recorder shown in Figs. 1, 2, and 3. Figs. 5 and 6 are detail views of a portion of the recorder as it appears when viewed from the left in Fig. 1, the parts being shown in one position in Fig. 5 and in another position in Fig. 6. Figs. 7 and 8 are detail views taken substantially on the line VII—VII and VIII—VIII, respectively, of Fig. 1. Fig. 9 is a sectional view taken substantially on the line IX—IX of Fig. 2.

Similar reference characters refer to similar parts in each of the several views.

Referring to the drawings, the graphic recorder in the form here illustrated comprises a suitable frame consisting of two runners 1 and 2 (see Fig. 9) secured in parallel spaced relation to the opposite sides of a bed plate 3. Attached to the undersides of the runners adjacent the rear end of the bed plate are depending standards 4 and 5 provided in their lower ends with aligned bearing openings 4a and 5a, respectively, which receive trunnions 6a and 6b formed on the opposite ends of a rod 6. The rod 6 supports a roll 7 of time-lined record paper, and in order to permit the trunnions to be readily inserted into place and removed from the bearing openings, the standard 5 is provided with a downwardly inclined slot 5b which communicates at its lower end with the bearing opening 5a.

The roll 7 of paper is held in the desired longitudinal position on the rod 6 by means of two knurled end plugs 8 and 9. The plug 8 is pinned to the rod adjacent one end of the rod, while the plug 9 is screwed onto a threaded portion 6c provided on the other end of the rod so that this latter end plug can readily be removed from the rod to permit the paper roll to be readily fastened in place on the rod. Each of the plugs 8 and 9 is provided at its inner end with a tapered portion 8a or 9a which is adapted to enter the hole in the center of the paper roll to center the paper roll on the rod, and a lock nut 10 is provided to lock the removable plug 9 in place on the rod 6 after the plug has been screwed into proper engagement with the adjacent end of the paper supply roll. It will be obvious that the paper roll supporting rod can readily be mounted in the standards by first sliding the trunnion 6a lengthwise into the bearing opening 4a, and then lowering the trunnion 6b into the bearing opening 5a through the inclined slot 5b. Removal of the rod 6 from the standards 4 and 5 to permit a new paper supply roll to be mounted on the rod can be effected by reversing the procedure just described.

The paper from the paper supply roll is carried upwardly over an idler roll 13 (Fig. 2), lengthwise of the bed plate 3, and then downwardly between two rolls 11 and 12 (Fig. 3) which constitute a part of a driving mechanism for advancing the record paper over the bed plate at a uniform rate of speed. The idler roll 13 is journaled at its ends in bearing brackets 14 secured to the undersides of the runners 1 and 2, and is so disposed that the uppermost portion of its surface lies in the same horizontal plane as the upper surface of the bed plate and its longitudinal axis extends parallel to the transverse axis of the bed plate.

A uniform tension is maintained on the paper leaving the paper supply roll 7 irrespective of the size of the roll by means of a drag rod 16 which is journaled at its ends in vertical slots 4c and 5c provided in the standards 4 and 5, and which is biased by gravity into engagement with the top of the paper roll at the point where the paper leaves the roll.

The drive roll 11 is supported on a central shaft 20 (Fig. 3) journaled in suitable anti-friction bearings 21 mounted in bearing openings provided in two end plates 17 and 18. The end plates 17 and 18 are fastened together in parallel spaced relation by means of three spacing rods 19, and the framework thus formed is bolted as a unit to the underside of the runners 1 and 2 by means of suitable machine screws which pass downwardly through clearance holes in the runners and are screwed into tapped holes formed in flanges provided on the upper ends of the end plates.

One end of the shaft 20 extends through the end plate 18, and is provided at its outer end with a worm wheel 22 which meshes with a worm gear 23 (Figs. 1 and 2) pinned to a drive shaft 24. The drive shaft 24 is journaled at one end in a bearing lug 25 provided on the end plate 18, and at the other end in a bearing lug 26 formed on a removable bearing bracket 27 secured to the end plate 18. A bevel gear 28 is pinned to the drive shaft 24 adjacent to the bearing lug 26, and this bevel gear meshes with a bevel pinion 29 mounted on the outer end of a stub shaft 30 journaled in the bearing bracket 27. The right-hand end of the shaft 24 cooperates with a stop screw 31 which is threaded through a short supporting lug 32 provided on the bracket 27. This screw is normally spaced a slight distance from the right-hand end of the drive shaft, as viewed in Fig. 2, and is provided to prevent damage to the bevel gears while the record paper is being set, as described hereinafter. The stop screw 31 is maintained in an adjusted position in the supporting lug 32 by means of a lock nut 31a screwed onto the screw 31.

The stub shaft 30 is provided at its inner end with a crank 33 formed with a laterally projecting arm 33a which extends loosely into a radially extending slot 34a (see Fig. 3) provided in a flanged coupling member 35 attached to a shaft 36 forming part of suitable motor means for driving the drive roller at a constant rate of speed. It will be obvious that the flanged coupling 35 and crank 33 together constitute a universal joint which permits the motor means to drive the stub shaft without binding irrespective of slight differences in alignment which may occur between the two shafts 30 and 36 due to necessary manufacturing tolerances.

The motor means may be of any suitable type capable of driving the drive roller at the desired uniform speed, but in the form here shown, this motor means comprises a synchronous motor of a well-known type operatively connected through suitable gearing not shown with the shaft 36. The motor means is secured to supporting lugs 38 cast integrally with the end plate 18.

The previously referred to pressure roll 12 is journaled at its ends in ball bearings mounted in two pressure arms 39 and 40 which are secured together in laterally spaced relation by a pressure roll release bar 41, and which together with the release bar comprise a supporting frame for the pressure roll. The arm 39 is provided at the end opposite to the release bar 41 with a bearing opening 39a which pivotally receives a laterally projecting pin 42 mounted on the end plate 17, while the arm 40 is provided at the end opposite to the release bar with an opening 40a, which rotatably receives an eccentric bushing 44. The bushing 44, in turn, pivotally receives a laterally projecting pin 43 mounted on the end plate 18. The bushing 44 is adapted to be rotated to different angular positions with respect to the arm 40 to enable the frame to be readily adjusted to the position in which the axes of the drive and pressure rolls are exactly parallel without the necessity for maintaining excessively close manufacturing tolerances, and to facilitate this rotation a saw kerf 44a for the reception of a screw driver is provided in the outer end of the bushing. The bushing may be locked in any angular position to which it is rotated by means of a set screw 46, as will be obvious from an inspection of the drawings. The frame formed by the two arms 39 and 40 and the associated release bar is biased upwardly to the position in which the pressure roll engages the record paper by means of two biasing springs 47 and 48. These springs are hooked at their upper ends over supporting pins 49 attached to the end plates 17 and 18, and at their lower ends through eyes formed on adjusting bolts 50 extending through the arms 39 and 40. The bolts 50 are provided at their lower ends with adjusting nuts 51 and lock nuts 52, whereby the biasing force exerted by the springs may be readily increased or decreased.

To provide the proper friction between the friction and drive rolls and the paper passing between these rolls and at the same time prevent wrinkling of the paper, the pressure roll 12 is provided with strips 60 (Figs. 1 and 3) of suitable yieldable material, such as felt having a sufficiently low adhesion to the paper to prevent wrinkling of the paper. As shown in Fig. 1, the strips 60 are wound spirally around the pressure roll in opposite directions from the center of the roll toward its ends.

In order to facilitate the insertion of the paper between the drive and presure rolls, it is desirable to be able to at times separate these rolls and to maintain them in separated positions, and to this end a latching dog 54 (see Figs. 5 and 6) is pivotally attached intermediate its ends to the end plate 17 in such manner that this dog is biased by gravity to a vertical position, but that, if the pressure roll is swung away from the drive roll and this dog is rotated away from its vertical position in a counterclockwise direction from its normal position in which it is shown in Fig. 5 to the position in which it is shown in Fig. 6 and the frame carrying the pressure roll is then released, this dog will act to hold the pressure roll away from the drive roll a sufficient distance to permit the paper to be readily inserted between the two rolls. The counter-clockwise position to which the dog can be moved is limited by a suitable stop bracket 55. After the pressure roll has been latched in its non-operative position, it can readily be restored to its normal operative position with respect to the drive roll by merely depressing the release bar a sufficient distance to move the arm 39 out of contact with the dog 54 and then releasing the release bar. As soon as the arm 39 moves out of contact with the dog 54, the dog will return by gravity to the normal position shown in Fig. 5 and the springs 47 and 48 will then be effective to restore the pressure roll to its proper operative relation with respect to the drive roll.

Secured to the runners 1 and 2 at their forward ends are two paper guides 56 and 57 which curve downwardly around the drive roll as best seen in Figs. 2 and 3, and which serve to cause the paper to follow the curvature of the drive roll when the paper is first being inserted into place in the recorder.

The desired record is provided on the record paper of the recorder by means of a plurality of pens 61 which are pivotally supported on a pen support bar 62 secured at its ends to the undersides of the runners 1 and 2. An inkwell 63 extends throughout the full length of the pen support bar 62 underneath the bar, and one end of each pen extends into the ink provided in the inkwell (see Fig. 8), while the other end of each pen is so disposed that it will trace a line on the record paper as the paper is moved underneath the pen by the drive mechanism. Each pen is provided with a rearwardly extending forked arm 61a which cooperates with the arm 64 of an associated operating electromagnet 65 (see Figs. 1 and 2) to operatively connected the pen with the magnet. The magnets are supported on a magnet support bar 66 secured at its ends to the undersides of the runners 1 and 2. The magnets may be of any suitable type but, as here shown, they are each three-position magnets employing two neutral windings 67 and 68, and are each similar to the magnet which is described in detail in an application for Letters Patent of the United States No. 574,539, filed by C. S. Snavely on January 25, 1945, for Electromagnet and Control Means Therefor, which application matured into Patent No. 2,425,843, on August 19, 1947. For a clear understanding of my present invention, it is sufficient to point out that when both of the windings 67 and 68 of the electromagnet 65 are deenergized, the pen will occupy a normal central position shown in Fig. 1 and will trace a line along the path 70 on the record paper. When, however, the upper winding 67 is energized, the pen will then be rotated in a counter-clockwise direction as viewed in Fig. 1, through a limited distance from its normal position and will trace a line along the path 71, whereas when the winding 68 is energized, the associated pen will be moved in the opposite direction and will trace a path along the line 72.

To facilitate filling the inkwell, an opening 62a (see Fig. 8) is provided in the bar 62 adjacent to the runner 2. This opening is normally closed by an inkwell cover 73 slidably supported between the underside of the runner 2 and the top of the support bar 62 for movement between a closed position in which it is shown in Fig. 8 and an open position in which the opening 62a in the bar 62 is exposed. To facilitate moving the cover, an upwardly projecting pin 73a is provided.

Disposed at the left-hand end of the pen support bar 62 as viewed in Fig. 1 is a pilot pen 79 so constructed that when the supply of ink in the inkwell has become reduced to the point where it should be replenished to maintain the pens in operation, this pilot pen will stop tracing a line on the record paper.

To protect the record paper and the pens from damage due to dirt and the like or from objects coming into contact with the paper or the pens and to permit the record traced on the paper by the pens to be observed at all times, two plate glass covers 80 and 81 are provided. These covers cooperate with velvet covered L-shaped slides 82 and 83 disposed in recesses 2a and 1a milled in the upper inner edge of the runners 1 and 2, and are prevented from vertical displacement by metal strips 15 secured to the upper sides of the runners. The glass covers are rectangular in shape and are of such lengths that when the velvet covered slides are spaced as far apart as the recesses 2a and 1a will permit, some clearance will exist between the covers and the slides. The slide 83 is constantly biased inwardly to the position in which its inner vertical edge engages both edges of the covers by means of a plurality of spring pressed biasing members 85 mounted in longitudinally spaced laterally extending holes 86 (see Fig. 7) drilled in the inner edges of the runners directly opposite the slides. The slides are held in fixed positions lengthwise of the runners by means of end plates 87 and 88 secured to the ends of the runners 1 and 2, respectively. The rear cover glass is somewhat wider than the front cover glass, and has two recesses 81a ground in its upper surface to facilitate gripping this cover to enable it to be readily moved to the different longitudinal positions with respect to the runners. To prevent breakage of the covers resulting from bumping the covers together at their adjoining edges, a strip 88 of plastic material is cemented or otherwise fastened to the lower edge of the glass cover 81 as viewed in Fig. 1. The lengths of the covers and slides are such that by moving the covers to different positions access to all parts of the record paper and to the pens can readily be had. It should be particularly pointed out that the spring bias exerted on the slide 83 by the biasing units enable both covers to be moved without binding by a force applied to any part of the top of the covers.

Attached to the runners adjacent their rear ends are supporting legs 90 which together with depending lugs 91 (see Figs. 2 and 3) formed on the end plates 17 and 18 provide a means for supporting the recorder as a whole on the top of a desk or any article suitable for this purpose.

A graphic recorder of the type described is particularly suitable for, although in no way limited to, use in connection with a centralized traffic control system for railroads, and when so used the recorder is intended to be mounted in the top of a desk incorporated in the control cabinet for the centralized traffic control system in such manner that the top surface of the recorder will be flush with and form a part of the desk top. One convenient means for mounting the recorder in the desk will now be described.

As illustrated, the desk top which is designated as a whole by the reference character 95 (see Fig. 1) is provided with a central rectangular opening 96 disposed behind a movable front portion 97 (Figs. 2 and 3) which can be swung upwardly for a purpose which will appear presently. The opening 96 is substantially the same width as the recorder, and secured to the desk top at opposite sides of the opening are two L-shaped recorder supports 98 and 99 (see Fig 9). The recorder runners 1 and 2 are provided in their outer edges with milled slots 1b and 2b, and the recorder supports are spaced apart such a distance that the runners 1 and 2 will engage the supports 98 and 99 at the tops of the slots 1b and 2b. The supports 98 and 99 are considerably longer than the runners 1 and 2 and project rearwardly beyond the front panel 100 of the cabinet through an opening 100a (see Fig. 2) provided in the front panel. It will be seen, therefore, that the graph can readily be inserted into place in the desk top from the rear of the cabinet by first resting the front ends of the runners on the rear ends of the recorder supports 98 and 99 and then sliding the recorder forwardly on the runners until the front ends of the runners engage the rear edge of the movable front portion 97 of the desk top in its lowered position. It will be noted that when the recorder is in place in the desk top, as shown in Fig. 2, that portion of the recorder in rear of the tips of the pens is disposed behind the front panel 100 of the cabinet so that only the tips of the pens are visible through the glass top of the recorder. To indicate the function of each pen, a small track model 101 may be provided directly above the pens, as shown in Fig. 2.

With the recorder in place in the cabinet, the record paper of the recorder as it leaves the pressure roll moves through a separable polished chute 102 into a storage bin 103.

The storage bin, as shown, is of sheet metal construction, and comprises a front wall 103a, a bottom wall 103b, end walls 103c and 103d and a back wall 100b. The bottom wall 103d is secured at its rear end to two spaced hinges 104 and 105, which latter, in turn, are secured to the vertical front wall 100 of the cabinet below the bin by means of separable fasteners 106. The separable fasteners 106 are of well-known construction and for purposes of my present invention, it is sufficient to point out that they are so constructed that when rotated to one position the shank portions of the fasteners can be inserted through or removed from clearance holes in the front wall of the cabinet, and that after they are inserted through the holes in the cabinet, if they are then rotated through an angle of 90° by inserting a screw driver into the saw kerf provided in the head of the fastener, a pin which extends through the shank portion of the fastener will cooperate with inclined surfaces provided on the female portion of the fastener in a manner to securely fasten the hinges in place on the front of the panel 100. The two end walls 103c and 103d of the bin are provided at their upper ends with outwardly projecting portions 103e and 103f which are secured to the front panel 100 of the cabinet by means of wing fasteners 107. The wing fasteners 107 except for the heads are similar to the fasteners 106 previously described.

The front wall 103a of the bin is somewhat shorter than the end walls 103c and 103d, and is provided at its upper end with an outwardly inclined portion 103g to which a recorder cover 103h is pivotally attached by means of laterally spaced hinges 108. The cover 103h extends outwardly and upwardly from the front wall 103a of the bin for a sufficient distance to completely enclose the forward end of the recorder, and is provided at its outer end with a thumb latch 109 by means of which the cover can be secured in a closed position, as shown in Fig. 2. The cover, however, is adapted to be at times dropped to a lower or open position in which it is shown in Fig. 3 to provide access to the record paper as it leaves the pressure and drive rolls to permit ready inspection of the paper at any time and also to permit severance of the portion of the paper which has moved into the bin.

The previously referred to chute comprises a chute top plate 110, see Fig. 3, bolted or otherwise fastened at its ends to the end plates 17 and 18 of the frame which supports the drive mechanism of the recorder and a chute bottom plate 111 secured at its ends by means of adjusting bolts 112 to slotted angle brackets 113 spot welded or otherwise secured to the recorder cover. It will be obvious that by loosening the adjusting bolts 112, the chute bottom plate can be slid backwardly or forwardly to positions in which it is spaced a greater or lesser distance from the chute top plate. The bottom plate is preferably so adjusted that when the cover member is latched in its closed position, the chute bottom plate will be spaced approximately one-quarter inch from the chute top plate.

It is at times desirable to be able to swing the bin 103 and associated cover member 103h forwardly away from the front panel of the cabinet to permit ready cleaning of the bin, and it will be obvious that this can be done by first lowering the cover member to the position shown in Fig. 3 and then removing the wing fasteners 107. The distance that the bin can be swung forwardly is limited by two chains 115, one end of each of which is secured to the underside of the associated recorder support, and the other end of each of which is secured to the inner side of an associated one of the end walls of the bin.

One advantage of a recorder constructed and mounted in the desk of a centralized traffic control machine in the manner described is that access to all parts of the record provided on the record paper except a very small portion which is passing between the drive and pressure rolls may readily be had at all times.

Another advantage of a recorder constructed and mounted in the manner described is that it is not necessary to disturb the timing of the recorder or its operation while removing that portion of the record from the recorder which has already been completed.

Another advantage of a recorder constructed in accordance with my invention is that since the record paper is advanced by means of the wringer action previously described, the timing is unaffected by variations in the thickness of the paper, and setting of the paper to any desired time can very readily be accomplished in either one of two ways. The one way consists in lowering the recorder cover and pulling the paper to the position in which the correct time-line is under the tips of the pens by grasping the paper at both edges of recorded paper in the chute section. An alternate method of adjusting the paper consists in raising the movable portion 97 of the desk top, and with one hand depressing the pressure roll release bar to hold the rolls separated. The paper can then be slid forwardly or backwardly with a slight pressure of the palm of the hand on any portion of the paper. The paper can thus be moved slowly until the desired time-line is under the tips of the pens.

A further advantage of a recorder embodying my invention is that due to the provisions of the eccentric bushing described hereinbefore, the pressure roll can readily be adjusted to the position in which both sides of the paper will be advanced exactly at the same speed, whereby the paper can be made to advance through the recorder without skewing.

Although I have herein shown and described only one form of graphic recorder embodying my invention, it is to be understood that various changes and modifications may be made therein within the scope of the appended claims without departing from the spirit and scope of my invention.

Having thus described my invention, what I claim is:

1. In an automatic recorder for making a record on paper supplied in a roll and adapted to be progressively advanced past a recording zone at a uniform rate of speed, the means for driving the paper comprising a drive roll journaled at its ends in end plates rigidly secured together in parallel spaced relation, drive mechanism secured to one end plate and operatively connected with said drive roll for driving it at a uniform rate of speed, two pressure arms pivotally mounted at one end on pins projecting from said two end plates and connected together at their opposite ends by a bar to form a pivotable frame, a pressure roll journaled at its ends in anti-friction bearings mounted in said frame arms intermediate their ends, means biasing said frame in the direction to constantly urge said pressure roll into contact with the paper passing over said drive roll, and an eccentric bushing interposed between one pin and the associated frame arm and rotatable to different positions to permit said frame to readily be adjusted to the position in which the axes of said drive and pressure rolls are parallel without the necessity for maintaining close manufacturing tolerances.

2. In a device in which paper which is supplied in a roll is unwound from the roll by holding the paper in frictional engagement with a drive roll by means of a pressure roll biased toward the drive roll, the improvement which comprises two pressure arms pivotally mounted at one end for supporting said pressure roll, an eccentric bushing comprising the pivotal mounting for at least one of said arms to permit one end of the pressure roll to be moved with respect to the other end in a manner to enable the axes of the drive and pressure rolls to be made parallel without the necessity for maintaining close manufacturing tolerances.

WILLIAM R. GRACEY, Jr.

REFERENCES CITED

The following references are of record in the file of this patent:

UNITED STATES PATENTS

| Number | Name | Date |
|---|---|---|
| 530,929 | Crittenden | Dec. 18, 1894 |
| 710,430 | Corbett | Oct. 7, 1902 |
| 884,336 | Kienast | Apr. 7, 1907 |
| 981,974 | Brown et al. | Jan. 17, 1911 |
| 1,200,779 | Thompson | Oct. 10, 1916 |
| 1,414,324 | Beaudinet | Apr. 25, 1922 |
| 1,506,491 | Kline | Aug. 26, 1924 |
| 1,564,519 | Brown | Dec. 8, 1925 |
| 1,569,064 | Archbald | Jan. 12, 1926 |
| 1,604,732 | Au | Oct. 26, 1926 |
| 1,638,560 | Beveridge | Aug. 9, 1927 |
| 1,718,146 | Hartman | June 18, 1929 |
| 1,967,900 | Perry et al. | July 24, 1934 |
| 2,011,736 | Saurez | Aug. 20, 1935 |
| 2,117,653 | Clifton et al. | May 17, 1938 |
| 2,202,547 | Bushnell | May 28, 1940 |
| 2,283,096 | Sandberg | May 12, 1942 |
| 2,319,273 | Sterling | May 18, 1943 |
| 2,384,722 | Blain | Sept. 11, 1945 |
| 2,509,650 | Oakhill | May 30, 1950 |